T. L. CARTER.
SEED PLANTER.
APPLICATION FILED JAN. 18, 1912.

1,062,766.

Patented May 27, 1913.
2 SHEETS—SHEET 1.

Witnesses
L. B. James
C. E. Hunt

Inventor
T. L. Carter
by H. B. Willson & Co.
Attorneys

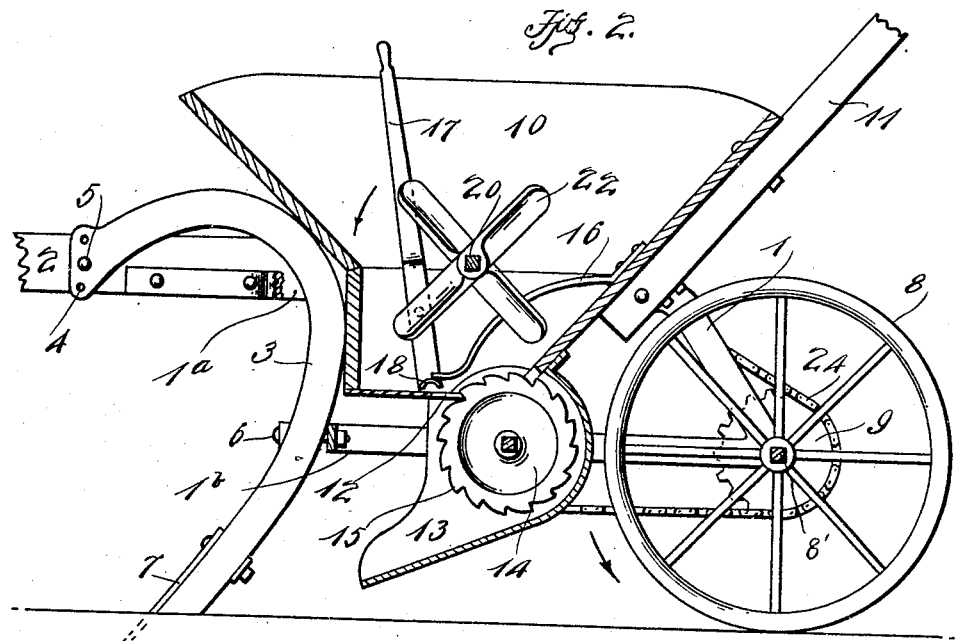
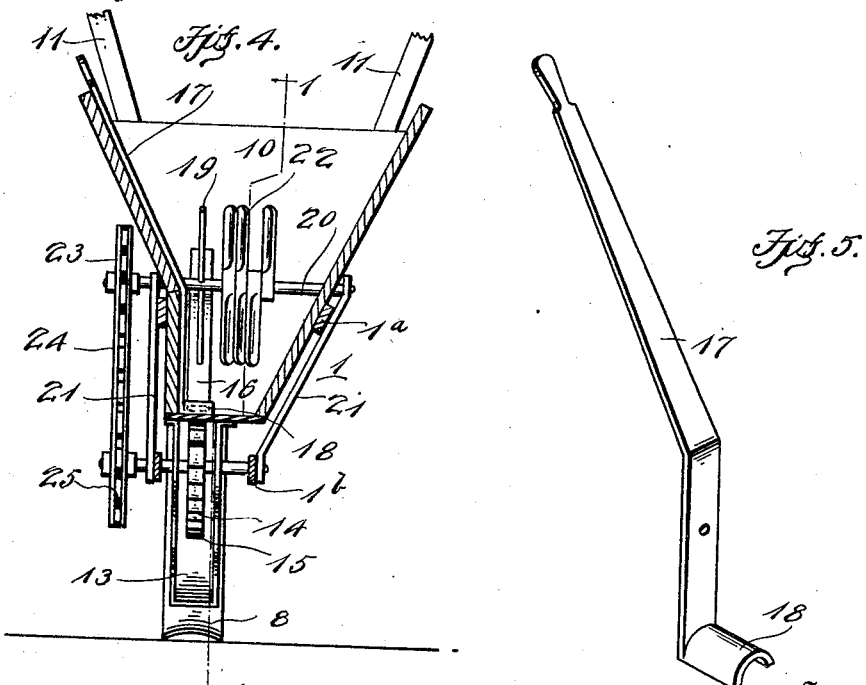

UNITED STATES PATENT OFFICE.

THOMAS L. CARTER, OF ATLANTA, GEORGIA.

SEED-PLANTER.

1,062,766. Specification of Letters Patent. Patented May 27, 1913.

Application filed January 18, 1912. Serial No. 671,840.

*To all whom it may concern:*

Be it known that I, THOMAS L. CARTER, a citizen of the United States, residing at Atlanta, in the county of Fulton and State of Georgia, have invented certain new and useful Improvements in Seed-Planters; and I do declare the following to be a full, clear, and exact description of the invention, such as will enable others skilled in the art to which it appertains to make and use the same.

This invention relates to improvements in seed planters.

One object of the invention is to provide a seed planter by means of which any kind of seed may be planted but which is particularly adapted for planting cotton seed and which is provided with an improved construction and arrangement of seed feeding mechanism whereby one seed at a time is fed from the hopper of the machine and said seeds dropped at regular intervals so that the plants will come up uniformly in the rows, thus greatly facilitating the chopping out or thinning of the plants.

With these and other objects in view the invention consists of certain novel features of construction, and the combination and arrangement of parts as will be more fully described and claimed.

Figure 1:
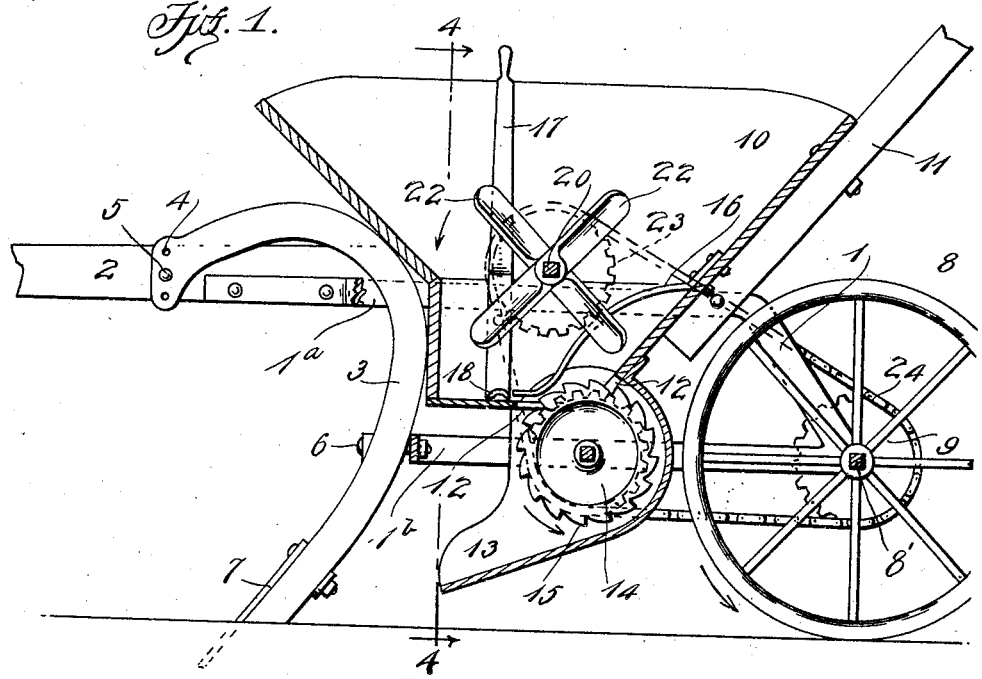
Figure 3:
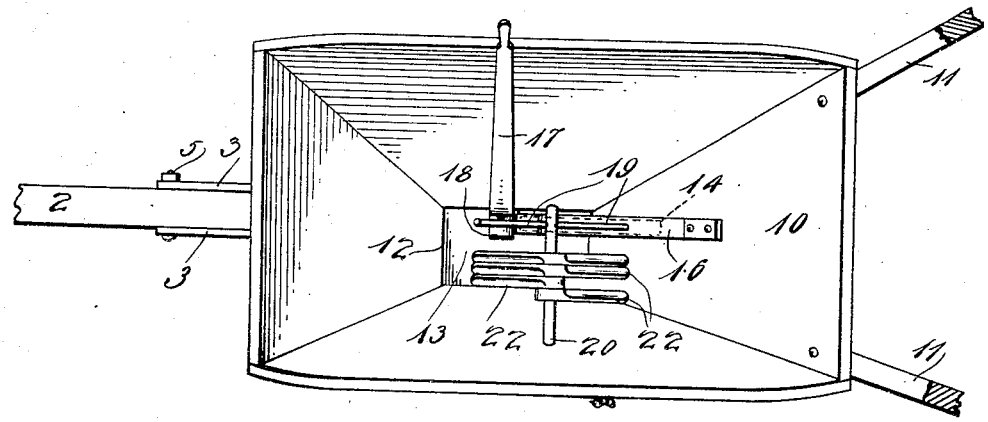

In the accompanying drawings; Figure 1 is a vertical longitudinal section of my improved planter taken on the line 1—1 of Fig. 4 and showing the regulating devise for the feeding mechanism in closed position; Fig. 2 is a similar view showing the regulating devices in another position; Fig. 3 is a top plan view of the machine; Fig. 4 is a vertical cross sectional view on the line 4—4 of Fig. 1; Fig. 5 is a detail view of the regulating lever for the feed controlling mechanism.

Referring more particularly to the drawings, 1 denotes the supporting frame of the machine, said frame comprising upper and lower pairs of side bars 1$^a$ and 1$^b$ to the forward ends of which are secured the draft beam 2 of the machine. To the inner end of the bar 2 is pivotally connected the upper end of a plow standard 3 comprising two curved bars having their upper ends disposed on opposite sides of the beam 2, said ends being provided with series of bolt holes 4 adapted to receive an attaching bolt 5 whereby the upper end of the plow is pivotally connected to the beam. The beam is further secured by a bolt 6 passing between the bars of the beam and engaging the forward end of the lower portion of the frame as shown. To the lower end of the standard may be adjustably secured a plow point or shovel 7 by means of which the furrow is opened to receive the seed dropped by the feeding mechanism of the planter as will be hereinafter more fully described.

Journaled in the rear end of the frame is a supporting and seed covering wheel 8 the axle 8' of which has its ends revolubly mounted in the rear ends of the lower side bars 1$^b$ of the frame as shown. The wheel 8 has a concaved or transversely curved rim the construction of which facilitates the closing of the furrow and the covering of the seed, said concaved rim forming a small ridge of soil over the deposited seeds. On one end of the axle 8' of the wheel 8 is fixedly mounted a sprocket gear 9 the purpose of which will be hereinafter described.

Arranged between and secured to the upper side bars of the frame 1 is a seed hopper 10 to the rear end of which are secured steering handles 11. In the bottom of the hopper and in the lower end of the rear wall thereof is formed a seed discharging passage 12. Secured to the lower side of the hopper beneath the passage 12 is a seed discharge chute 13 the lower end of which extends downwardly in position to discharge the seeds into the furrow opened by the plow 7. Revolubly mounted in the upper portion of the chute 13 is a seed discharging wheel 14, said wheel having in its periphery a series of notches 15 which receive the seed and convey the same from the hopper to the chute 13. The upper portion of the wheel when thus arranged projects through the passage 12 and revolves in the lower portion of the hopper and with said projecting upper portion of the wheel is adapted to co-act a spring guard or feed controlling plate 16 the upper end of which is secured to the rear wall of the hopper, while its lower end is bent forwardly over the forward end of the passage 12 and in the adjacent portion of the feed wheel 14 as clearly shown in Figs. 1 and 2 of the drawings. When thus arranged the plate 16 will prevent the notches 15 of the wheel from carrying more than one seed at a time through the passage 12 in the hopper thus causing the seed to be regulated and uniformly fed from the machine and discharged into the furrows at substantially equal distances apart. In order to regulate the position of the spring guard plate 16 to permit the discharge of seeds of different sizes, I provide a plate adjusting lever 17, said lever being pivotally secured near its lower end to the inner surface of one side of the hopper and projecting upwardly to a slight distance above said side as shown. The lever 17 is bent or formed at an angle to correspond with the angular or inclined side of the hopper and on the lower end of the lever is formed a lateral or angularly projecting plate lifting lug 18, said lug being of segmental form or curved transversely as shown.

In order to agitate the seed and to prevent the same from packing in the bottom of the hopper, I provide a plurality of agitating fingers 19 which project radially from a supporting and operating shaft 20 journaled in suitable bearings in the sides of the hopper and in the upper ends of the supporting bars 21 forming part of the frame of the machine. In addition to the fingers 19 I also employ a series of radially projecting agitating blades or paddles 22 which are detachably secured to the squared portion of a shaft 20 preferably at one side of the guard plate 16 as shown. In practice sets of blades of different lengths will be provided and are adapted to be interchangeably secured to the shaft 20 whereby blades suitable for any kind of seed may be arranged in position for use in the hopper. The blades 22 are preferably beveled on one side and when arranged as shown will agitate and force the seed beneath the spring guard 16 and into position to be engaged and taken one at a time by the notches 15 in the rim of the wheel 14.

On one end of the shaft 20 is fixedly mounted a sprocket gear 23 with which is adapted to be engaged a sprocket chain 24, said chain passing around the sprocket gear 25 on the adjacent end of the shaft of the feed wheel 14 and being engaged with the sprocket gear 9 on the shaft of the supporting and operating wheel 8 in the rear end of the machine whereby the movement of said wheel is imparted to the feed wheel and to the agitating blades and these parts thus driven in the proper direction to positively feed one seed at a time from the hopper. In the operation of my improved planter the seed are taken directly from the gin and without having the lint removed therefrom are placed in the hopper of the planter. The agitating blades 22 by their bevel construction force the seed between the spring guard plate 16 and the adjacent side of the hopper and into engagement with the projecting upper edge of the feed wheel arranged below the guard plate. As hereinbefore described the lower end of the guard plate is disposed in close relation to the edge of the feed wheel and as the notches in said wheel are only of sufficient size to receive one large seed or two small seeds, only this number are carried out by each tooth beneath the end of the guard plate and discharged from the hopper. By this construction and arrangement of the wheel and the guard plate it will be seen that the seeds are practically pulled or forced out of the hopper and discharged by the wheel into the chute 13 from which they are deposited into the furrow opened by the plow point 7. By means of this positive feeding mechanism the undelinted cotton seed may be readily discharged from the hopper.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

In a planting machine of the character described, a supporting frame, operating means mounted thereon, a hopper having a feed passage located in the bottom thereof, a seed discharging wheel revolubly mounted in the frame and forming a closure for the passage in said hopper, whereby the seeds are conveyed from the hopper during the movement of the machine, a spring guard secured to the rear wall of the hopper and extending over the passage in the lower end of the hopper and the seed discharging wheel mounted below the hopper, a lever pivoted to one side of the hopper, a curved lifting lug forming the lower end of the lever and adapted for engagement with the disconnected free end of the spring guard, whereby the latter is regulated, blades mounted within the hopper and arranged above the guard and in close relation to the opening located in the bottom of said hopper, and to one side of said guard, said blades being adapted to be rotated during the movement of the machine.

In testimony whereof I have hereunto set my hand in presence of two subscribing witnesses.

THOMAS L. CARTER.

Witnesses:
J. A. HUGHES,
WILL MAULDIN.